(12) United States Patent
Flick (10) Patent No.: US 6,480,095 B1
(45) Date of Patent: Nov. 12, 2002

(54) VEHICLE CONTROL SYSTEM INCLUDING MULTI-DIGIT CONTROL SWITCH AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 0 days.

(21) Appl. No.: 09/430,149

(22) Filed: Oct. 29, 1999

Related U.S. Application Data (63) Continuation-in-part of application No. 09/374,947, filed on Aug. 16, 1999, now Pat. No. 6,130,606, and a continuation-in-part of application No. 09/035,546, filed on Mar. 5, 1998, now Pat. No. 6,037,854, application No. 09/430,149, which is a continuation-in-part of application No. 09/353,498, filed on Jul. 15, 1999, now Pat. No. 6,320,514, which is a continuation of application No. 08/622,515, filed on Mar. 25, 1996, now Pat. No. 6,140,938, which is a continuation-in-part of application No. 08/423,570, filed on Apr. 14, 1995, now Pat. No. 5,654,688.

(51) Int. Cl.[7] ................................................ G06F 7/04
(52) U.S. Cl. ................................................ 340/5.2
(58) Field of Search ................ 340/426, 5.21, 340/5.64, 5.72, 825.37, 825.72; 341/174, 176

(56) References Cited

U.S. PATENT DOCUMENTS

| | | | |
|---|---|---|---|
| 4,205,300 A | 5/1980 | Ho et al. ................. 340/65 |
| 4,327,444 A | 4/1982 | Court ..................... 455/100 |
| 4,383,242 A | 5/1983 | Sassover et al. .......... 340/64 |
| 4,414,541 A | 11/1983 | Ho ....................... 340/566 |
| 4,450,437 A | 5/1984 | Ho ....................... 340/540 |
| 4,628,400 A | 12/1986 | Ho ....................... 361/172 |
| 4,674,454 A | 6/1987 | Phairr ................... 123/179 B |
| 4,754,255 A | 6/1988 | Sanders et al. ............ 340/64 |
| 4,812,814 A | 3/1989 | Elliott ................... 340/332 |
| 4,893,240 A | 1/1990 | Karkouti ................. 364/424.05 |
| 5,024,186 A | 6/1991 | Long et al. .............. 123/179 B |

(List continued on next page.)

FOREIGN PATENT DOCUMENTS

WO  WO 92/02702  2/1992  .......... E05B/49/00

OTHER PUBLICATIONS

Lexus, *1995 Repair Manual SC400 SC300*, vol. 3, (first printing Jan. 10, 1994) pp. BE–479—BE–522.

Omega Research & Development, Inc. Owner's Manual, Model #1, 1997.

*Primary Examiner*—Daryl Pope
(74) *Attorney, Agent, or Firm*—Allen, Dyer, Doppelt, Milbrath & Gilchrist, P.A.

(57) ABSTRACT

A vehicle control system is readily entered into a desired mode, yet provides high security for the user and includes a controller vehicle for performing at least one vehicle function responsive to a transmitter, such as a remote transmitter or passive transponder. The controller is switchable among a plurality of modes. The system also includes a switch at the vehicle that cooperates with the controller for switching the controller to a desired mode responsive to operation of the switch in a sequence corresponding to a multi-digit user code. The controller preferably counts operations of the switch, such as a momentary contact switch, occurring within a predetermined time of each other as a respective digit of the multi-digit user code. The controller, within a predetermined time window after a previous operation, counts successive operations of the momentary contact switch within a predetermined time of each other as a next digit of the multi-digit user code. Accordingly, the user can readily enter his multi-digit user code, while a would-be thief would be unable to try all of the possible multi-digit code permutations. The controller may be switchable to a transmitter learning mode, a valet mode, a coded override mode, or a feature programming mode, for example.

39 Claims, 4 Drawing Sheets

U.S. PATENT DOCUMENTS

| | | | |
|---|---|---|---|
| 5,040,990 A | 8/1991 | Suman et al. | 439/34 |
| 5,049,867 A | 9/1991 | Stouffer | 340/426 |
| 5,103,221 A | 4/1992 | Memmola | 340/825.31 |
| 5,129,376 A | 7/1992 | Parmley | 123/179.2 |
| 5,132,660 A | 7/1992 | Chen et al. | 340/428 |
| 5,146,215 A | 9/1992 | Drori | 340/825.32 |
| 5,148,159 A * | 9/1992 | Clark et al. | 340/825.22 |
| 5,159,334 A | 10/1992 | Baumert et al. | 340/825.72 |
| 5,278,547 A | 1/1994 | Suman et al. | 340/825.32 |
| 5,285,186 A | 2/1994 | Chen | 340/428 |
| 5,309,144 A | 5/1994 | Lacombe et al. | 340/539 |
| 5,323,140 A | 6/1994 | Boyles | 340/428 |
| 5,365,225 A | 11/1994 | Bachhuber | 340/825.31 |
| 5,412,379 A | 5/1995 | Waraksa et al. | 340/825.72 |
| 5,467,070 A | 11/1995 | Drori et al. | 340/426 |
| 5,469,151 A | 11/1995 | Lavelle et al. | 340/825.36 |

* cited by examiner

VEHICLE CONTROL SYSTEM INCLUDING MULTI-DIGIT CONTROL SWITCH AND ASSOCIATED METHODS

RELATED APPLICATIONS

The present application is a continuation-in-part of U.S. patent application Ser. No. 09/374,947 filed Aug. 16, 1999, now U.S. Pat. No. 6,130,606. The present application is also a continuation-in-part of U.S. patent application Ser. No. 09/035,546 filed Mar. 5, 1998 now U.S. Pat. No. 6,037,854. The present application is also a continuation-in-part of U.S. patent application Ser. No. 09/353,498, filed Jul. 15, 1999, now U.S. Pat. No. 6,320,514 which, in turn, is a continuation of U.S. patent application Ser. No. 08/622,515 filed on Mar. 25, 1996, now U.S. Pat. No. 6,140,938 which, in turn, is a continuation-in-part of U.S. patent application Ser. No. 08/423,570, filed Apr. 14, 1995, now U.S. Pat. No. 5,654,688. The entire disclosures of each of these applications and patent is incorporated herein by reference.

FIELD OF THE INVENTION

The present invention is related to the field of control systems, and, more particularly, to a control system for a vehicle and associated methods.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. The remote transmitter may be used to arm and disarm the vehicle security system or provide other remote control features from a predetermined range away from the vehicle.

As disclosed in U.S. Pat. No. 5,049,867 to Stouffer and Pat. No. 5,146,215 to Drori, the security system controller may include features to store and compare unique codes associated with a plurality of remote transmitters, each remote transmitter having its own unique code initially programmed therein. U.S. Pat. No. 5,146,215 in particular discloses that remote transmitter codes may be added or deleted from the controller corresponding to the number of remote transmitters desired by the user.

Other vehicle security systems include a passive transponder, typically carried on the key ring of the user. The transponder must be presented within the vehicle to an associated transponder reader to permit the vehicle engine to start and run. The transponder includes a transmitter and a receiver. The receiver is used to capture energy radiated from the transponder reader. This energy is temporarily stored and used to power the transmitter.

There are also other desirable features of many conventional vehicle security systems, such as the ability to place the system in a valet mode so that others may use the vehicle without triggering the alarm. Typically a valet switch is positioned so as to be hidden in an area not readily visible in the vehicle. The user may operate the valet switch to enter the valet mode and exit the valet mode. In addition, the valet switch also has been used to permit the user to stop an alarm, such as when the user loses a remote transmitter or the battery fails, for example. The hidden valet switch may be awkward to operate and may also be of limited security value, since there are only so many places to position such an important switch within the vehicle.

U.S. Pat. No. 5,467,070 to Drori et al. discloses a vehicle security system including a valet switch in the form of a three-position slide switch which includes an open center position, a momentary contact side position, and a latched side position. To enter a code digit, the user taps and releases the momentary side of the valet switch the number of times corresponding to the digit to be entered followed by a motion to the latched side to signal completion of the digit. If the code has multiple digits, the process is repeated for each digit. When a correct valid code is entered, the siren is chirped a predetermined number of times to indicate that a valid code has been entered.

Unfortunately, the three-position slide switch may be difficult to operate. Since the switch may also be positioned out of view of the driver, the three positions may be awkward to coordinate. In addition, confirmation of the entry of the correct digit may permit a would-be thief to try a number of code permutations and thereby determine the correct code.

SUMMARY OF THE INVENTION

In view of the foregoing background, it is therefore an object of the present invention to provide a vehicle control system that is readily entered into a desired mode, yet which provides high security for the user.

This and other objects, features, and advantages in accordance with the present invention are provided by a vehicle control system comprising a controller vehicle for performing at least one vehicle function responsive to a transmitter, the controller being switchable among a plurality of modes; and a switch at the vehicle and cooperating with the controller for switching the controller to a desired mode responsive to operation of the momentary contact switch in a sequence corresponding to a multi-digit user code.

The controller preferably counts operations of the switch, such as a momentary contact switch, occurring within a predetermined time of each other as a respective digit of the multi-digit user code. In addition, the controller, within a predetermined time window after a previous operation, may count successive operations of the momentary contact switch within a predetermined time of each other as a next digit of the multi-digit user code. Accordingly, the user can readily enter his multi-digit user code, while a would-be thief would be unable to try all of the possible multi-digit code permutations. User convenience is enhanced without compromising security.

The controller may be switchable to a transmitter learning mode for learning at least one new uniquely coded transmitter. The controller may also be switchable to a valet mode, coded override or off mode, or a feature programming mode, for example. Of course, the controller also typically has one or more normal operating modes, such as armed and disarmed modes.

The multi-digit user code preferably comprises a two digit code. In addition, each digit of the multi-digit user code is preferably between one and nine. An indicator may be provided for confirming entry of a digit of the multi-digit user code. Such an indicator preferably does not indicate entry of the correct digit, but rather just entry of a digit so that the user knows to then enter the second digit. Moreover, a would-be thief is not quickly notified that a correct digit has been entered.

A method aspect of the invention is for switching a controller at a vehicle among a plurality of modes. The controller is preferably for performing at least one vehicle function responsive to a transmitter signal. The method preferably comprises the steps of: providing a depressable switch at the vehicle and connected to the controller, and depressing the switch in a sequence corresponding to a multi-digit user code and switching to a predetermined mode responsive thereto. The method also preferably includes the step of using the controller to count operations of the switch occurring within a predetermined time of each other as a respective digit of the multi-digit user code.

The method may also include the step of, within a predetermined time window after a previous operation, using the controller to count successive operations of the switch within a predetermined time of each other as a next digit of the multi-digit user code. As mentioned above, the predetermined mode may be at least one of a transmitter learning mode, a valet mode, a coded override mode, and a feature programming mode.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
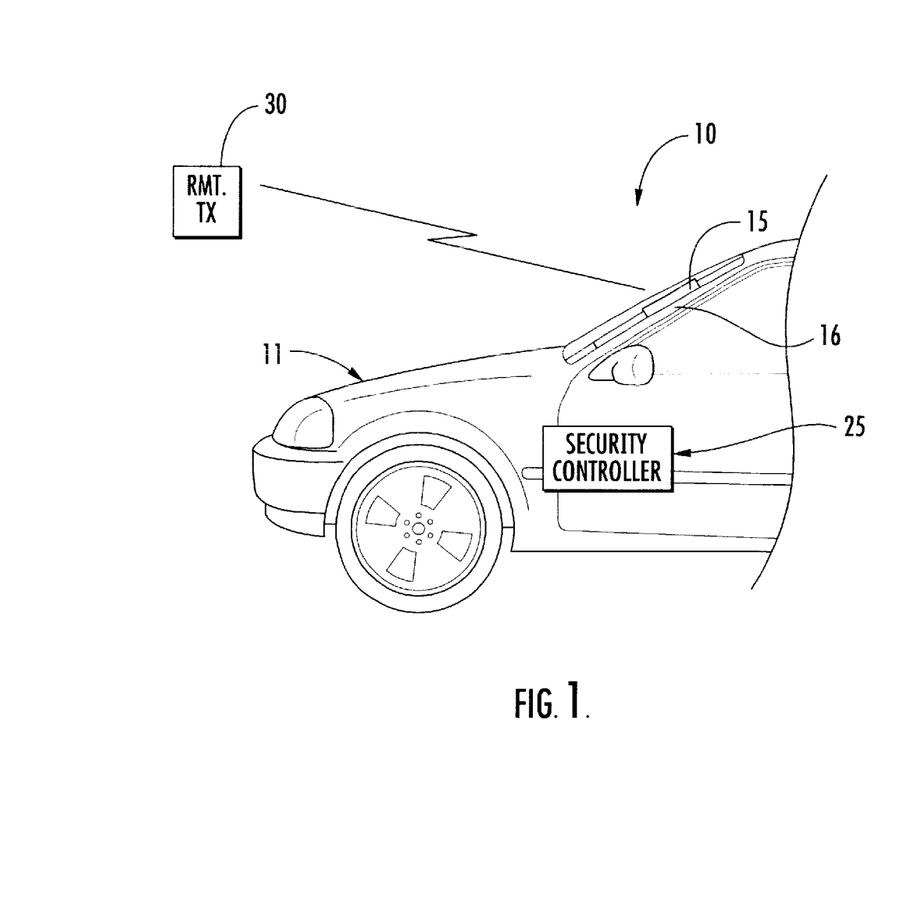
FIG. 1 is a schematic diagram of a first embodiment of a vehicle security system mounted in a vehicle in accordance with the present invention.
Figure 2:
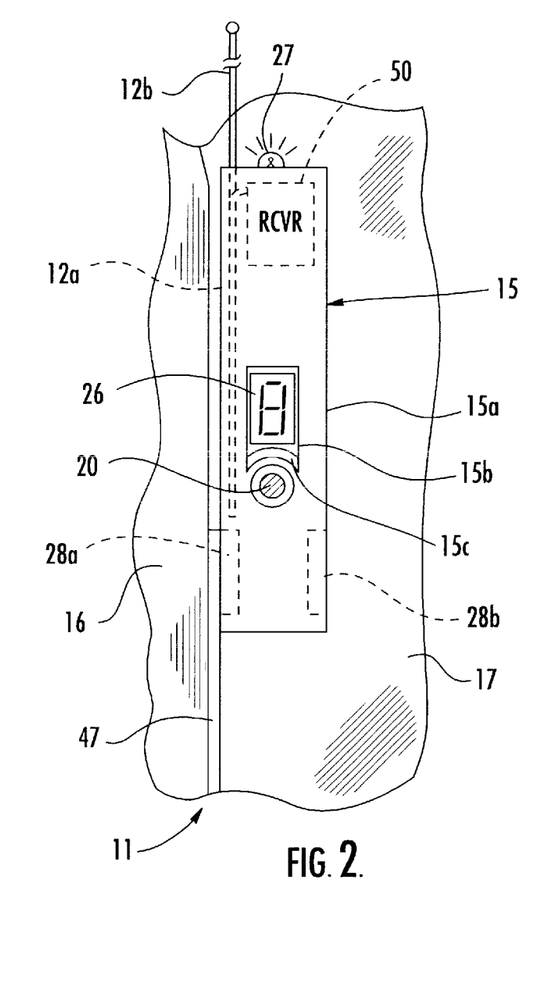
FIG. 2 is an enlarged front view of the first housing for the antenna and receiver shown mounted on the windshield adjacent the driver's side roof pillar in accordance with the present invention.

Turning now initially to FIGS. 1 and 2, the components of the vehicle security system 10 positioned in a vehicle 11 in accordance with the present invention are described. The vehicle security system 10 includes an antenna which may either be an internal antennal 12a or an external antenna 12b, or a combination of internal and external, and preferably in the form of a vertical conductor, for example. In the illustrated embodiment, the antenna 12a, 12b is carried by a first housing 15 for positioning adjacent the front windshield 17 of the vehicle 11. The first housing 15 may be positioned adjacent the driver's side a roof pillar 16 as shown in the illustrated embodiment. Those of skill in the art will appreciate other similar positions in the vehicle 11 which will provide a more effective location for the antenna 12a, 122b.

A control switch 20 is carried by the first housing 15. In addition, the security system 10 includes a security controller 25 positioned in spaced apart relation from the first housing 15. For example, the security controller 25 may be positioned in a lower forward portion of the passenger compartment, such as under the dashboard, for example, as will be readily understood by those skilled in the art.

The controller 25 is for performing at least one vehicle function responsive to a remote transmitter 30, and the controller is switchable among a plurality of modes. For example, the controller 25 may be switchable between a valet mode, a feature programming mode, a coded override or off mode, and a transmitter learning mode as will be appreciated by those skilled in the art. Of course, armed and disarmed modes represent normal operating modes for the security system 10. The switch 20 cooperates with the controller 25 for switching the controller to the desired mode responsive to operation of the switch in a sequence corresponding to a multi-digit user code.

In the transmitter learning mode, the controller 25 can learn one or more new uniquely coded remote transmitters. Such a transmitter may be remote transmitter generating a code which has at least a pseudorandom portion for additional security, such as against code grabbing, as will be readily appreciated by those skilled in the art.

In the valet mode, or the coded override mode, the controller 25 will not generate an alarm indication responsive to a security sensor. In the feature programming mode, various selectable operating features of the security system may be selected. Further information regarding these modes is also found in parent patent, U.S. Pat. No. 5,654,688. The coded override mode is also described in greater detail below.

The control switch 20 is preferably a depressable momentary contact switch. Such a switch 20 is far easier to operate than, for example, the three-position slide switch disclosed in U.S. Pat. No. 5,467,070 as discussed above in the background of the invention. In addition, the controller 25 preferably counts operations or depressions of the switch 20 occurring within a predetermined time of each other as a respective digit of the multi-digit user code. For example, the controller 25 may require that depressions occur within 2 seconds or less from each other. Other times are also possible.

The controller 25, preferably within a predetermined time window after a previous operation, counts successive operations of the switch 20 within a predetermined time of each other as a next digit of the multi-digit user code. For example, the time window may be between about 2 and 5 seconds, for example. If the user waits longer than 5 seconds to enter a next digit, the controller may reset itself. Again, the other ranges for the time window are also possible.

The user can readily enter his multi-digit user code using the control switch 20, while a would-be thief would be unable to try all of the possible multi-digit code permutations. The multi-digit user code preferably comprises a two digit code, although three or more digits could be used in other embodiments. Each digit of the multi-digit user code is preferably between one and nine. User convenience is enhanced without compromising security.

An indication, such as a siren chirp or flashing light, may be provided for confirming entry of a digit of the multi-digit user code. Such an indicator preferably does not indicate entry of the correct digit, but rather just entry of a digit so that the user knows to then enter the second digit. Confirmation of a correct digit would simplify a thief's task of trying various code permutations until finding the correct multi-digit code, by determining one correct digit at a time.

The security controller 25 is responsive to signals from one or more remote transmitters 30 as will be readily appreciated by those skilled in the art. The antenna 12a, 12b, of course, is for receiving signals from the one or more remote transmitters 30.

Figure 3:
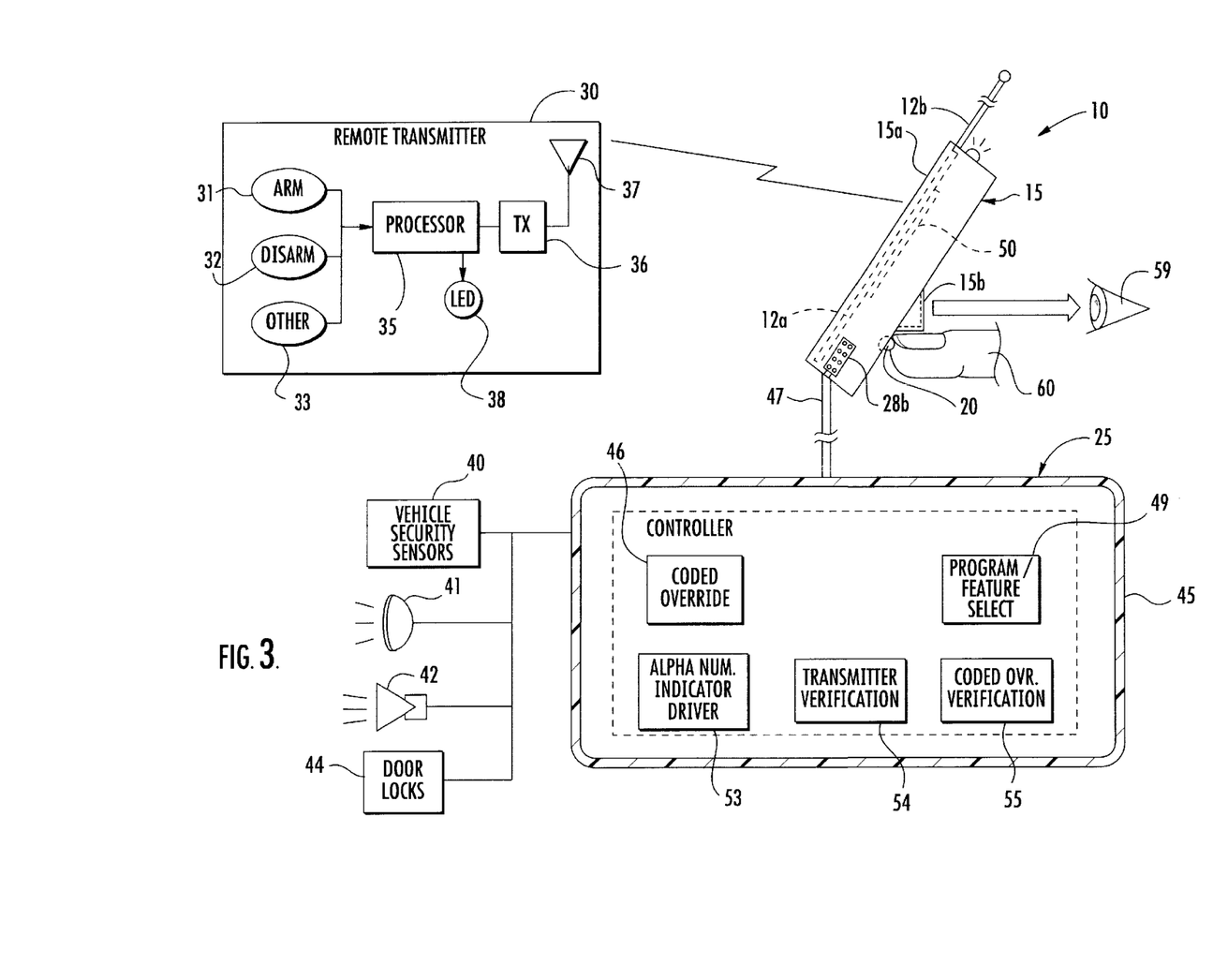
FIG. 3 is a schematic block diagram of the first embodiment of the vehicle security system as shown in FIG. 1 illustrating the system in greater detail.

Referring now additionally to FIG. 3, the security controller 25 is preferably switchable between armed and disarmed modes, such as based upon signals from the remote transmitter 30. As would be readily appreciated by those skilled in the art, a typical remote transmitter 30 may include arm 31, disarm 32 and one or more other 33 pushbutton switches. The illustrated remote transmitter 30 also includes a processor 35 coupled to a transmitter 36 and an internal antenna 37 as would be readily understood by those skilled in the art. The remote transmitter 30 may also include an LED 38, which may flash to confirm transmission, for example. A battery, not shown, may also be used to power the remote transmitter 30.

When in the armed mode, the controller 25 is capable of generating an alarm signal responsive to a sensed vehicle condition from the schematically illustrated vehicle sensors 40. Those of skill in the art will readily appreciate that such sensors may include door, trunk, hood switches, as well as more complicated proximity or motion sensors. The security controller 25 may also be operatively connected to the vehicle lights 41, to a siren 42, or the vehicle horn, for example. Of course, the security controller 25 may be coupled to a cellular telephone or other wireless communication device to transmit a remote alarm indication in addition to or as an alternative to the conventional local alarm indication.

The controller 25 may also be connected to control the vehicle door locks 44 as will be readily appreciated by those skilled in the art. As will also be readily appreciated by those skilled in the art, the features described herein in detail with reference to a security system providing an alarm indication also apply to a remote keyless entry system which provides vehicle security by controlling the vehicle door locks 44 without performing some of the other more advanced security features, including the alarm indication. Accordingly, the term vehicle security system and vehicle control system are used to include such remote keyless entry systems as well.

The security controller 25 may also include a passive arming feature for passively arming by switching to the armed mode responsive to a sensed vehicle condition. For example, the security controller 25 may enter the armed mode a predetermined time after the engine is turned off and the last door is closed thereby indicating that the user has left the vehicle. Those of skill in the art will appreciate that other passive arming scenarios are also contemplated by the invention without requiring further description herein.

As shown in the illustrated embodiment, the security controller 25 may be positioned in a second housing 45. The second housing 45 may be located out of sight in the forward lower portion of the vehicle, for example, or any other conventional mounting location as will be appreciated by those skilled in the art. An interconnecting cable 47 extends between the first and second housings 15, 45, to interconnect the components thereof. In one particularly advantageous embodiment, the first housing 15 also contains the radio frequency receiver 50. The receiver 50 may comprise one or more integrated circuits or discrete circuit components mounted on a printed circuit board, for example. By positioning the receiver 50 in the first housing 15 adjacent the antenna 12a, 12b, the radio signal may be received and demodulated, so that the cable 47 may only need insulated wires rather than a coaxial cable, as will be readily appreciated by those skilled in the art. In addition, the sensitivity of the reception may also be increased by positioning the receiver 50 in the first housing 15 without requiring a relatively long interconnecting cable for the RF signal.

According to another particularly advantageous feature of the security system 10, the security controller 25 may include coded override means 46 for switching to the disarmed mode from the armed mode responsive to operation of the control switch 20 in a predetermined pattern based upon a user override code. Those of skill in the art will appreciate that the coded override means 46 or feature may be implemented in a microprocessor operating under stored program control. Alternately, the coded override could be implemented with discrete logic components.

The coded override feature, for example, allows the user to turn off the alarm indication when the user returns to the vehicle without a properly functioning remote transmitter to switch the controller to the disarmed mode. When the user opens the door with the key, the alarm will sound and the user needs to stop the alarm. In addition, since the vehicle security controller 25 may also include vehicle shut-off circuits for the fuel, starter, and/or ignition, the coded override allows the vehicle to be operated.

The coded override means 46 may accept a multi-digital override code input as a series of control switch 20 operations as described herein. Since in the illustrated embodiment the control switch 20 is in plain view and easily accessible within the vehicle, the convenience of this feature is greatly enhanced. This is especially so since the alarm may be sounding as the user inputs the override code.

In the coded override mode, the remote transmitter 30 can also be used to switch the controller 25 between the armed and disarmed states as will be appreciated by those skilled in the art. The multi-digit user code can also be used to switch the controller 25 to a valet mode wherein the security controller is disarmed and is prevented from passively arming. In the valet mode, the remote transmitter 30 cannot typically operate the controller 25; rather, the controller must first be taken out of the valet mode as will also be appreciated by those skilled in the art.

An indicator carried by the first housing 15 may cooperate with the security controller to acknowledge input of the override code. For example, the alphanumeric indicator 26 or the LED indicator 27 may be used. Alternately, or in addition to one of these indicators, the vehicle horn or siren 42 could be sounded or chirped to acknowledge switching to the coded override or off mode.

In accordance with yet another aspect of the invention, the control switch 20 may be used to enter a programming mode and/or permit programming of the system features. Those of skill in the art will appreciate that for many vehicle security systems, there are a number of programmable or settable features, such as alarm duration, various timers, etc. Typically the installer or user sets the controller 25 to a learning or programming mode, and the individual selectable features may be sequentially selected. The particular sequence and features are not important to this aspect of the invention; rather, the ability to program from the control switch 20 is a significant feature of the present invention. The program/feature select means 49 of the security controller 45 may be implemented also using the same processor as the other features. The multi-digit coded pressing of the switch 20 is preferably required to enter the programming mode, and/or one or more vehicle conditions may need to exist prior to permitting entry into the programming mode as will also be appreciated by those skilled in the art.

The first housing 15 may have a generally rectangular elongate shape. Another feature of the security system 10 is the provision of first and second redundant connectors 28a, 28b mounted in spaced relation on the first housing 15 so that the interconnecting cable 47 is connectable to one of the connectors to facilitate routing of the interconnecting cable. The first housing 15 may be mounted on the left or right side of the front window 17, for example. In addition, the first housing 15 may be mounted adjacent the rearview mirror or other areas where the ability to connect the cable 47 to either side of the housing 15 is a significant advantage for providing a simple and clean installation.

Another important user convenience feature of the present invention is the provision of at least one indicator carried by the first housing 15. An indicator in the illustrated embodiment is an alphanumeric indicator 26 as will be understood by those skilled in the art. The alphanumeric indicator 26 is relatively compact and thus facilitates placement on the housing 15 which also contains the antenna 12. The antenna 12a, 12b may be preferably placed in a vertical orientation, such as may be desired for enhanced reception from the remote transmitter 50. The alphanumeric indicator 26 is operatively connected to the alphanumeric indicator drive circuit 53 of the security controller 25. The indicator 26 may be used to convey many types of information readily and easily to a user.

In the past, many conventional vehicle security systems had only a single LED to be flashed to the user. Accordingly, the amount of information conveyed by flashes of the LED is limited in comparison to the alphanumeric display 26 of the security system 10 of the present invention. In the illustrated embodiment, security system 10 also includes a simple LED 27 which may also convey information to a user, such as flashing to indicate an armed condition, as will be appreciated by those skilled in the art. Other uses are also contemplated for the alphanumeric indicator 26 and its associated driver or drive means 53 as will be readily appreciated by those skilled in the art.

For example, the alphanumeric indicator 26 may convey information on the current mode of the security system 10. The indicator 26 may also or alternately be used for displaying an indication related to the status of the vehicle sensors 40 to the user. For example, a history or current operating state of a sensor could be displayed. The alphanumeric display 26 could also be used during programming of the security system functions, so that the programming is considerably easier than with conventional systems.

Several other important types of information may also be readily communicated to the user in accordance with other aspects of the invention. The security controller 25 may include transmitter verification means 54 for determining a number of uniquely coded remote transmitters 30 capable of operating the security controller. If the number changes, or there is some other indication that a learning mode for the transmitters has been recently entered, the user receives notification. This feature prevents unauthorized learning of a remote transmitter that can later be used to defeat the security system.

The transmitter verification feature is further explained in parent patent, U.S. Pat. No. 5,654,688 and other aspects of transmitter verification are disclosed in U.S. patent application Ser. No. 08/681,785, filed Mar. 25, 1996 entitled "Remote Control System Suitable for a Vehicle and Having Remote Transmitter Verification", the entire disclosure of which is also incorporated herein by reference in its entirety.

The transmitter verification means 54 may cooperate with the alphanumeric indicator driver 53 and the indicator 26 to thereby indicate the number of remote transmitters 30 capable of operating the security controller 25 to the user. The security controller 25 may also include coded override verification means 55 for determining a number of override codes capable of operating the security controller on the indicator, along the lines of the remote transmitter verification feature described above. Both verification features may be readily a implemented using a processor or circuitry as described above for the other features of the security system 10 as will be readily appreciated by those skilled in the art.

Yet another aspect of the first housing 15 is that it may include a body portion 15a and an indicator mounting portion 15b extending outwardly therefrom at a predetermined angle so that when the body portion is mounted to an inclined windshield 17 the alphanumeric indicator 26 is mounted in a generally upright orientation for easier viewing by the eyes 59 of the user as shown in the upper right-hand portion of FIG. 3.

The control switch 20 may also be advantageously positioned below the indicator mounting portion 152b. Accordingly, the indicator mounting portion 15b preferably has an arcuate surface 15c on a lower portion thereof for guiding a finger 60 (FIG. 3) of the user to the control switch 20. Accordingly, the use of switch 20 and overall operation of the security system 10 are greatly enhanced.

Figure 4:
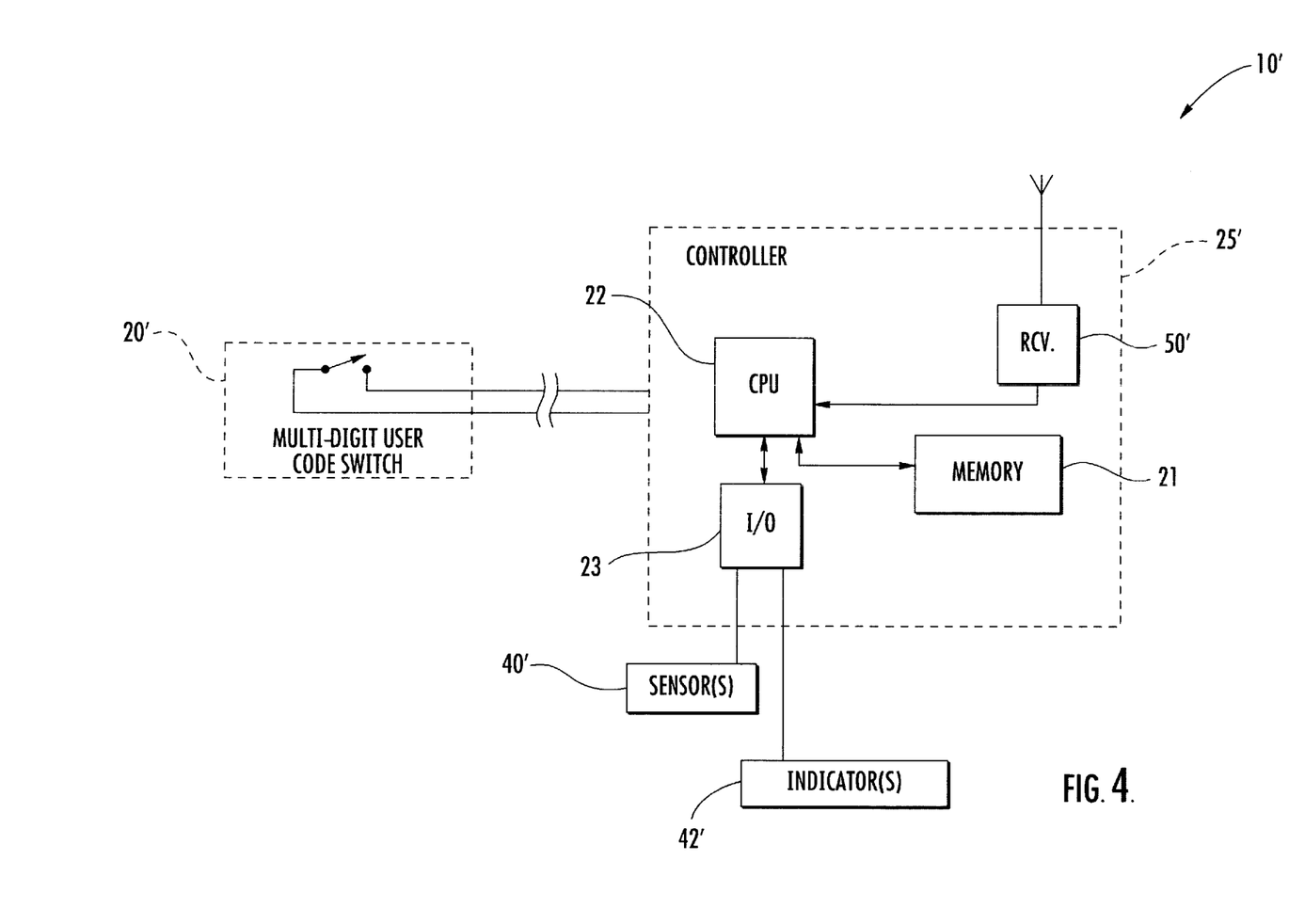
FIG. 4 is a schematic block diagram of a vehicle security system in accordance with a second embodiment of the invention.

Referring now additionally to FIG. 4, an alternate embodiment of a security or control system 20' is now described. In this embodiment, the controller 25' illustratively includes a central processing unit or CPU 22 connected to a memory 21 and an input/output circuit 23. In this embodiment, the receiver 50' is included within the overall housing of the controller 20' as will be readily appreciated by those skilled in the art. The multi-digit user code switch 20' is connected to the controller 25', and the switch may be positioned anywhere in the vehicle 11, and preferably convenient to the driver. The input/output circuit 23 are connected to the schematically illustrated sensor(s) 20' and indicator(s) 42'. In this embodiment, the switch 20' may be used to enter any of the desired operating modes of the controller 25' as described extensively above.

Figure 5:
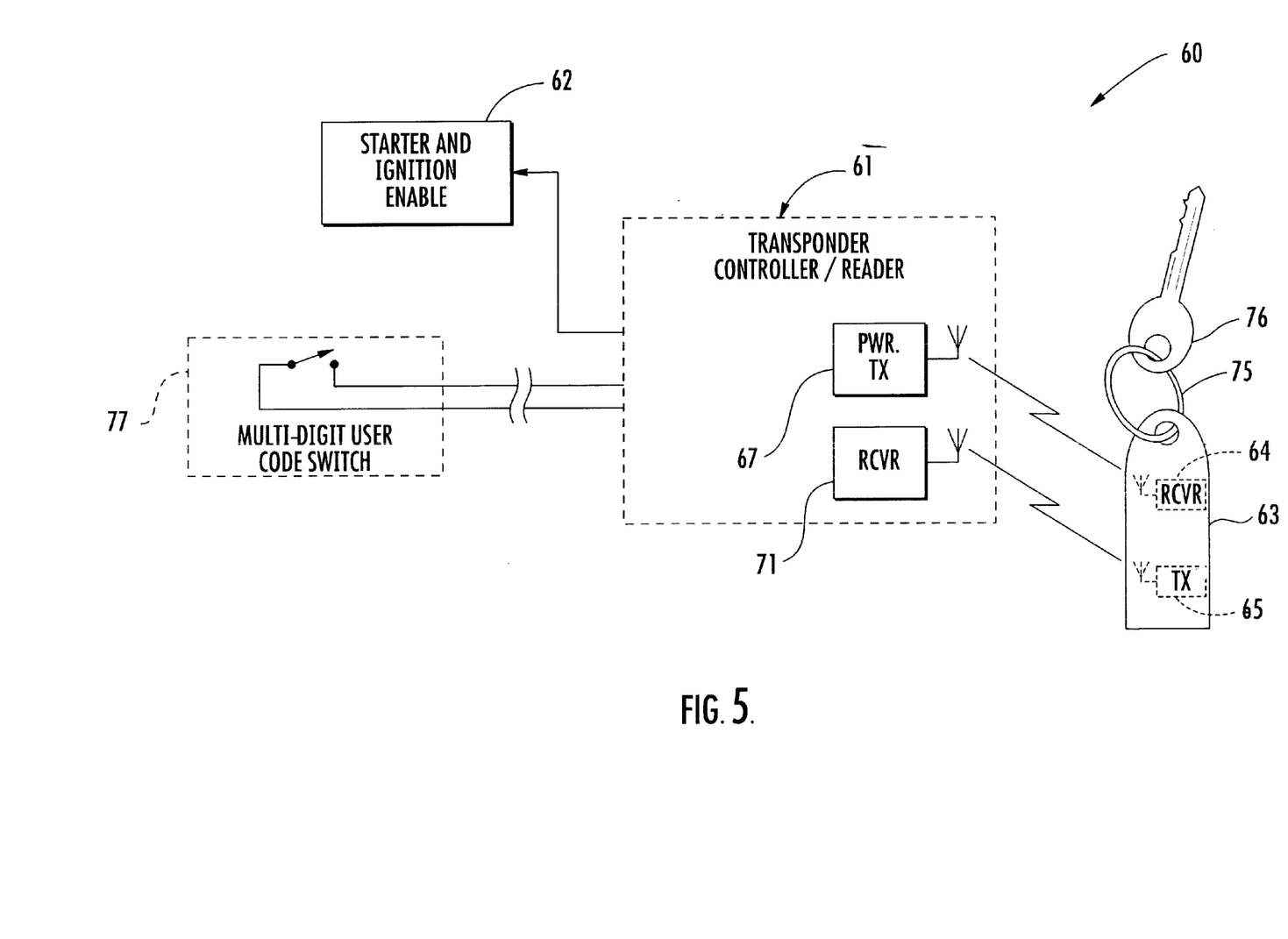
FIG. 5 is a schematic block diagram of a third embodiment of a vehicle security system in accordance with the present invention.

Turning now to FIG. 5, a third embodiment of the invention is described. In this embodiment, the multi-digit user code feature is incorporated in a transponder immobilizer circuit 60 as will be appreciated by those skilled in the art. The circuit includes a transponder controller and reader 61 installed at the vehicle. The controller reader 61 is connected to a starter and/or ignition enable device or circuit 62 which can selectively immobilize the vehicle if the proper coded passive transponder 63 is not presented in or adjacent the vehicle.

More particularly, the transponder controller and reader 61 illustratively includes a powering transmitter and antenna 67 and a receiver 71 for receiving a uniquely coded signal from the transmitter 65 of the transponder 63. The transponder 63 is illustratively connected to a key ring 75 which also carries an ignition key 76. In addition, the transponder 63 illustratively includes a receiver 64 which receives the powering signal from the transponder controller and reader 61 as will be appreciated by those skilled in the art. As will also be appreciated by those skilled in the art, the transponder 63 typically includes an energy storage device, such as a capacitor, not shown, for storing energy to power the transmitter 65. Accordingly, the transponder 63 is passive in the sense that it includes no battery or other power source to replace. Rather, power is radiated to the transponder 63 from the transponder controller and reader 61.

The transponder controller and reader 61 may also be switchable to a transmitter or transponder learning mode as explained above with respect to the remote transmitters used for other types of vehicle security systems. The transponder controller and reader 61 is switchable to the transponder learning mode, for example, using the multi-digit code switch 77 also used as described extensively above. Accordingly, this description need not be repeated again here, as those of skill in the art will readily appreciate the operation of the multi-digit user code switch 77 in cooperation with the transponder controller and reader 61 without further discussion.

A method aspect of the invention is for switching a controller 25, 25', 61 at a vehicle 11 among a plurality of modes. The controller 25, 25', 61 is preferably for performing at least one vehicle function responsive to a transmitter signal. The method preferably comprises the steps of: providing a depressable switch 20, 20', 77 at the vehicle and connected to the controller 25, 25', 63; and depressing the switch in a sequence corresponding to a multi-digit user code and switching to a predetermined mode responsive thereto.

The method also preferably includes the step of using the controller 25, 25', 63 to count operations of the switch 20, 20', 77 occurring within a predetermined time of each other as a respective digit of the multi-digit user code. The method may also include the step of, within a predetermined time window after a previous operation, using the controller 25, 25', 63 to count successive operations of the switch 20, 20', 77 within a predetermined time of each other as a next digit of the multi-digit user code. As mentioned above, the predetermined mode may be at least one of a transmitter learning mode, a valet mode, and a feature programming mode.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle control system comprising:
    a transmitter to be carried by a user;
    a controller at the vehicle for performing at least one vehicle function responsive to said transmitter, said controller being switchable among a plurality of modes; and
    a depressable momentary contact switch at the vehicle and cooperating with said controller for switching said controller to a desired mode responsive to depressing of said depressable momentary contact switch in a sequence corresponding to a multi-digit user code;
    said controller counting operations of said depressable momentary contact switch occurring within a predetermined time of each other as a respective digit of the multi-digit user code.

2. A vehicle control system according to claim 1 wherein said controller, within a predetermined time window after a previous operation, counts successive operations of said depressable momentary contact switch within a predetermined time of each other as a next digit of the multi-digit user code.

3. A vehicle control system according to claim 1 further comprising an indicator for confirming entry of a digit of the multi-digit user code irrespective of whether the digit is correct or not.

4. A vehicle control system according to claim 1 wherein said controller is switchable to a transmitter learning mode for learning at least one new uniquely coded transmitter.

5. A vehicle control system according to claim 1 wherein said transmitter generates a pseudorandomly coded signal.

6. A vehicle control system according to claim 1 wherein said transmitter comprises a remote transmitter.

7. A vehicle control system according to claim 1 wherein said transmitter comprises a passive transponder transmitter.

8. A vehicle control system according to claim 1 wherein said controller is switchable to a valet mode.

9. A vehicle control system according to claim 1 wherein said controller is switchable to a coded override mode.

10. A vehicle control system according to claim 9 wherein said controller still permits said transmitter to cause said controller to perform the at least one function in the coded override mode.

11. A vehicle control system according to claim 1 wherein said controller is switchable to a feature programming mode.

12. A vehicle control system according to claim 1 wherein the multi-digit user code comprises a two digit code.

13. A vehicle control system according to claim 1 wherein each digit of the multi-digit user code is between one and nine.

14. A vehicle control system comprising:
    a transmitter to be carried by a user;
    a controller at the vehicle for performing at least one vehicle function responsive to said transmitter, said controller being switchable among a plurality of modes;
    a switch at the vehicle and cooperating with said controller for switching said controller to a desired mode responsive to operation of said switch in a sequence corresponding to a multi-digit user code;
    said controller counting operations of said switch occurring within a predetermined time of each other as a respective digit of the multi-digit user code; and
    an indicator for confirming entry of a digit of the multi-digit user code irrespective of whether the digit is correct or not.

15. A vehicle control system according to claim 14 wherein said controller, within a predetermined time window after a previous operation, counts successive operations of said switch within a predetermined time of each other as a next digit of the multi-digit user code.

16. A vehicle control system according to claim 14 wherein said controller is switchable to a transmitter learning mode for learning at least one new uniquely coded transmitter.

17. A vehicle control system according to claim 14 wherein said transmitter generates a pseudorandomly coded signal.

18. A vehicle control system according to claim 14 wherein said transmitter comprises a remote transmitter.

19. A vehicle control system according to claim 14 wherein said transmitter comprises a passive transponder transmitter.

20. A vehicle control system according to claim 14 wherein said controller i s switchable to a valet mode.

21. A vehicle control system according to claim 14 wherein said controller is switchable to a coded override mode.

22. A vehicle control system according to claim 21 wherein said controller still permits said transmitter to cause said controller to perform the at least one function in the coded override mode.

23. A vehicle control system according to claim 14 wherein said controller is switchable to a feature programming mode.

24. A vehicle control system according to claim 14 wherein the multi-digit user code comprises a two digit code.

25. A vehicle control system according to claim 14 wherein each digit of the multi-digit user code is between one and nine.

26. A vehicle control system comprising:
   a controller at the vehicle for performing at least one vehicle function responsive to a transmitted signal, said controller being switchable among a plurality of modes; and
   a switch at the vehicle and cooperating with said controller for switching said controller to a desired mode responsive to operations of said switch in a sequence corresponding to a multi-digit user code;
   said controller counting operations of said switch occurring within a predetermined time of each other as a respective digit of the multi-digit user code.

27. A vehicle control system according to claim 26 wherein said controller, within a predetermined time window after a previous operation, counting successive operations of said switch within a predetermined time of each other as a next digit of the multi-digit user code.

28. A vehicle control system according to claim 26 further comprising an indicator for confirming entry of a digit of the multi-digit user code irrespective of whether the digit is correct or not.

29. A vehicle control system according to claim 26 wherein said controller is switchable to at least one of a transmitter learning mode, a valet mode, a coded override mode, and a feature programming mode.

30. A vehicle control system according to claim 26 wherein the multi-digit user code comprises a two digit code.

31. A vehicle control system according to claim 26 wherein each digit of the multi-digit user code is between one and nine.

32. A vehicle control system according to claim 26 wherein said switch comprises a depressable momentary contact switch.

33. A method for switching a controller at a vehicle among a plurality of modes, the controller for performing at least one vehicle function responsive to a transmitter signal, the method comprising the steps of:
   providing a depressable switch at the vehicle and connected to the controller;
   depressing the switch in a sequence corresponding to a multi-digit user code and switching to a predetermined mode responsive thereto; and
   using the controller to count operations of the switch occurring within a predetermined time of each other as a respective digit of the multi-digit user code.

34. A method according to claim 33 further comprising the step of, within a predetermined time window after a previous operation, using the controller to count successive operations of the switch within a predetermined time of each other as a next digit of the multi-digit user code.

35. A method according to claim 33 further comprising the step of confirming entry of a digit of the multi-digit user code irrespective of whether the digit is correct or not.

36. A method according to claim 33 wherein the predetermined mode is at least one of a transmitter learning mode, a valet mode, a coded override mode, and a feature programming mode.

37. A method according to claim 33 wherein the multi-digit user code comprises a two digit code.

38. A method according to claim 33 wherein each digit of the multi-digit user code is between one and nine.

39. A method according to claim 33 wherein the switch comprises a depressable momentary contact switch.

* * * * *

UNITED STATES PATENT AND TRADEMARK OFFICE
CERTIFICATE OF CORRECTION

PATENT NO. : 6,480,095 B1 Page 1 of 1
DATED : November 12, 2002
INVENTOR(S) : Kenneth E. Flick It is certified that error appears in the above-identified patent and that said Letters Patent is hereby corrected as shown below:

Title page,
Item [63], Related U.S. Application Data, delete "6,037,854" and insert -- 6,037,859 --

Signed and Sealed this

Seventh Day of September, 2004

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,480,095 B1 | Page 1 of 2 |
| APPLICATION NO. | : 09/430149 | |
| DATED | : November 12, 2002 | |
| INVENTOR(S) | : Kenneth E. Flick | |

It is certified that error appears in the above-identified patent and that said Letters Patent is hereby corrected as shown below:

Cover, Section (63)        Delete Section (63) and replace with the following:

Insert: -- Continuation-in-part of application No. 09/374,947, filed on Aug. 16, 1999, now Pat. No. 6,130,606, which is a continuation of application No. 09/165,997 filed October 2, 1998, now Pat. No. 5,982,277, which is a continuation of application No. 08/681,785 filed July 29, 1996, now Pat. No. 5,818,329, which is a continuation-in-part of application No. 08/423,570 filed April 14, 1995, now Pat No. 5,654,688, application No. 09/430,149, is a continuation-in-part of application No. 09/353,498, filed on Jul. 15, 1999, now Pat. No. 6,320,514, which is a continuation of application No. 08/622,515, filed on Mar. 25, 1996, now Pat. No. 6,140,938, which is a continuation-in-part of application No. 08/423,570, filed on Apr. 14, 1995, now Pat. No. 5,654,688, application No. 09/430,149, is a continuation-in-part of application No. 09/035,546, filed on Mar. 5, 1998, now Pat. No. 6,037,859. --

Column 1, Line 6         Delete: "Lines 6-19"

Insert: -- The present application is a continuation-in-part of U.S. Patent Application Serial No. 09/374,947 filed August 16, 1999, now U.S. Patent No. 6,130,606 issued October 10, 2000, which, in turn, is a continuation of U.S. Patent Application Serial No. 09/165,997 filed October 2, 1998, now U.S. Patent No. 5,982,277 issued November 9, 1999, which, in turn, is a continuation of U. S. Patent Signed and Sealed this
Twenty-fifth Day of September, 2012

David J. Kappos
*Director of the United States Patent and Trademark Office*

CERTIFICATE OF CORRECTION (continued)
U.S. Pat. No. 6,480,095 B1

Application Serial No. 08/681,785 filed July 29, 1996, now U.S. Patent No. 5,818,329 issued October 6, 1998, which, in turn, is a continuation-in-part of U.S. Patent Application Serial No. 08/423,570 filed April 14, 1995, now U.S. Patent No. 5,654,688 issued August 5, 1997. The present application is also a continuation-in-part of U.S. Patent Application Serial No. 09/353,498 filed July 15, 1999, now U.S. Patent No. 6,320,514 issued November 20, 2001, which, in turn, is a continuation of U.S. Patent Application Serial No. 08/622,515 filed March 25, 1996, now U.S. Patent No. 6,140,938 issued October 31, 2000, which, in turn, is a continuation-in-part of U.S. Patent Application Serial No. 08/423,570, filed April 14, 1995, now U.S. Patent No. 5,654,688 issued August 5, 1997. The present application is also a continuation-in-part of U.S. Patent Application Serial No. 09/035,546 filed March 5, 1998, now U.S. Patent No. 6,037,859 issued March 14, 2000. The entire disclosures of each of these applications and patents are incorporated herein by reference. --

| | |
|---|---|
| Column 4, Line 14 | Delete: "122b"<br>Insert: -- 12b -- |
| Column 8, Line 39 | Delete: "152b"<br>Insert: -- 15b -- |
| Column 11, Line 10<br>Claim 20 | Delete: "i s"<br>Insert: -- is -- |